3,524,984
Patented Aug. 18, 1970

3,524,984
NUCLEAR EXPLOSION DETECTION SYSTEMS
Reginald Allan Fothergill and Gordon Graham Hicks, Basingstoke, England, Alan John MacGovern, Waltham, Mass., and Kenneth George Norman, Basingstoke, England, assignors to United Kingdom Atomic Energy Authority, London, England
Filed Apr. 25, 1967, Ser. No. 633,568
Claims priority, application Great Britain, May 6, 1966, 20,289/66
Int. Cl. G01t 1/16
U.S. Cl. 250—83.3
13 Claims

ABSTRACT OF THE DISCLOSURE

The system receives the transient radiofrequency signal and the fast- and slow-rising portions of the transient optical signal radiated from a nuclear explosion, and generates three corresponding output pulses only if these signals meet specified rate-of-rise, duration and amplitude criteria. These pulses, if generated, are combined to give an output only if they occur in a specified time-sequence. The occurrence of this output indicates a nuclear explosion and not, for example, a lightning flash. Additionally, the yield of the explosion may be measured as the time between the fast- and slow-rising portions.

BACKGROUND OF THE INVENTION

This invention relates to nuclear explosion detection systems for explosions taking place at or above ground level. In addition to detecting the occurrence of such explosions, it can be adapted to give an indication of their yield.

Nuclear explosions are characterised by the radiation of radiofrequency and optical transients and, in principle, these transient signals can be used to detect the occurrence of a nuclear explosion and to estimate its yield. The difficulty is that such transients are also radiated by naturally occurring phenomena such as lightning. The object of the present invention is to provide a sensitive system capable of distinguishing nuclear explosions down to comparatively low yields occurring at substantial distances, from naturally occurring phenomena, with a low chance of error.

The present invention takes advantage of certain observed characteristics of the radiofrequency and optical transients radiated from a nuclear explosion which occur in a definable time-sequence in such transients, but are most unlikely to occur in this time-sequence if arising from other phenomena such as lightning.

SUMMARY OF THE INVENTION

According to the present invention a nuclear explosion detection system comprises means for receiving the transient radiofrequency signal radiated from the explosion, means for deriving from said radiofrequency signal a first output pulse if its rate of rise exceeds a predetermined value, its duration is less than a predetermined time and its field-strength exceeds a predetermined level, means for receiving the fast- and slow-rising portions of the transient optical signal radiated from the explosion and converting them to electrical signals, means for deriving from said fast-rising portion a second output pulse if its rate of rise exceeds a predetermined value and its duration is less than a predetermined time, means for deriving from said slow-rising portion a third output pulse if its rate of rise exceeds a predetermined value and its duration exceeds a predetermined time, and means for causing the occurrence of said first second and third output pulses in a predetermined time-sequence to indicate a nuclear explosion.

The means for converting said portions of the transient optical signals to electrical signals preferably comprises photo-voltaic generator means connected across transformer primary winding means of sufficiently low DC resistance to cause said generator means to operate in a substantially linear mode.

Preferably the system comprises further means for deriving said second output pulse if the amplitude of said fast-rising portion exceeds the saturation level of the opto-electrical conversion means for more than a predetermined time.

The system may also comprise means for measuring the time interval between the occurrence of said fast-rising portion and the commencement of said slow-rising portion to indicate the yield of the explosion.

The means for deriving said first output pulse may comprise means for generating a fourth pulse of predetermined length if the amplitude of the radiofrequency signal exceeds a predetermined level, means for differentiating the radiofrequency signal and generating a fifth pulse of duration equal to the duration of the differentiated signal above a predetermined amplitude, first gate means opened for a predetermined time by the leading edge of said fifth pulse to pass the back edge of said fifth pulse if of shorter duration than said predetermined time, means triggered by said back edge for generating a sixth pulse of predetermined length, and a first coincidence circuit for combining said fourth and sixth pulses to produce said first pulse.

The means for deriving said second output pulse may comprise means for differentiating the converted optical signal, said differentiating means having a short time-constant to respond to the fast-rising portion of the optical signal, and for generating a seventh pulse of duration equal to the duration of the differentiated signal above a predetermined amplitude, and second gate means opened for a predetermined time by the leading edge of said seventh pulse to pass the back edge of said seventh pulse if of shorter duration than said predetermined time, the output of said second gate means constituting said second output pulse.

The means for deriving said third output pulse may comprise means for differentiating the converted optical signal, said differentiating means having a long time-constant to respond to the slow-rising portion of the optical signal, and for generating an eighth pulse of duration equal to the duration of said differentiated signal above a predetermined amplitude, third gate means opened at a predetermined time from the leading edge of said eighth pulse to pass said eighth pulse if of longer duration than said predetermined time, such output of said third gate means constituting said third output pulse.

The means for causing the occurrence of said first, second and third output pulses to indicate an explosion may comprise a second coincidence circuit for combining said first and second output pulses, means triggered by the output of the second coincidence circuit for generating a ninth pulse of predetermined length, and a third coincidence circuit for combining said ninth pulse with said third output pulse, the presence of an output from said third coincidence circuit indicating the occurrence of an explosion.

The further means for deriving said second output pulse may comprise means for generating a tenth pulse of duration equal to the duration, above a predetermined level, of the saturating part of the optical signal commencing with the fast-rising portion, fourth gate means opened at a predetermined time from the leading edge of said seventh pulse to pass said tenth pulse if of longer duration than said predetermined time, and means for combining the output of said fourth gate means with the output of said second gate means.

The means for measuring the delay between the occurrence of said fast-rising portion and the commencement of caid slow-rising portion may comprise timing means started by the output of said second coincidence circuit and stopped by the output of said third coincidence circuit.

DESCRIPTION OF THE DRAWINGS

To enable the nature of the present invention to be more readily understood, attention is directed, by way of example, to the accompanying drawings, wherein.

DESCRIPTION OF THE PREFERRED EMBODIMENT

Figure 1:
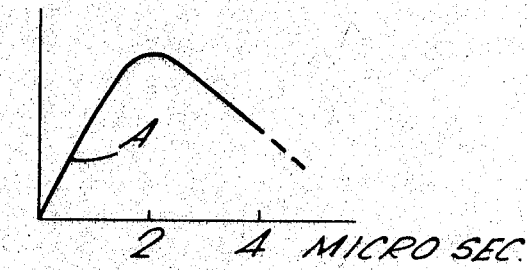
FIG. 1 is a graph of a form of radiofrequency transient radiated by a nuclear explosion as received at a distance, on a linear time-scale.

FIG. 1 shows one form of radiofrequency transient radiated by a nuclear explosion and detectable by an aerial. Such transients can take complex forms, but include a portion (shown as A in the simple example of FIG. 1) received as a rapid change of electrical field strength, of either polarity. In the embodiment to be described, this transient must satisfy the following criteria to be characteristic of a nuclear explosion, viz. peak field strength $>\pm 3$ volts/metre; rate of rise $>5$ volts/metre $\mu$sec; duration to peak $<2.5$ $\mu$sec.

Figure 2:
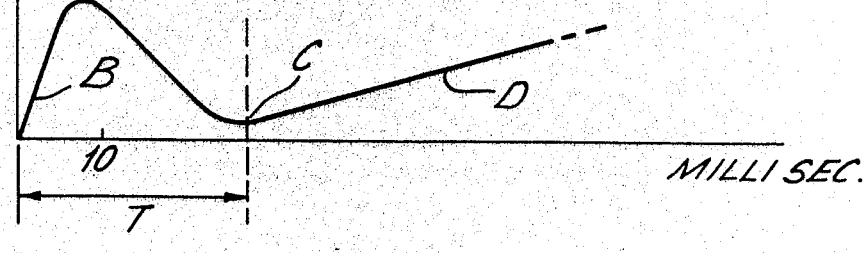
FIG. 2 is a graph of the form of optical transient radiated by such an explosion, on an approximately logarithmic time-scale.

FIG. 2 shows the form of optical transient radiated by a nuclear explosion. It is detectable by a solar cell which converts the light to an electric current. In the embodiment to be described, this transient must satisfy the following criteria to be characteristic of a nuclear explosion, viz. the rate of rise of the initial fast-rising portion B must be maintained for less than 8 msecs. unless the input signal exceeds a saturating value, in which case it must be maintained for at least 8 msecs; the rate of rise of the subsequent slow-rising portion D, starting from the first minimum C, must be maintained for more than 80 msecs. The rates of rise must also exceed minimum values.

The yield of the explosion is determined as the time T to the first minimum C, according to the equation $$w \text{ (yield)} = 0.0349 \, T^{2.25}$$

where T is in msecs. and W in kilotons.

Figure 3:
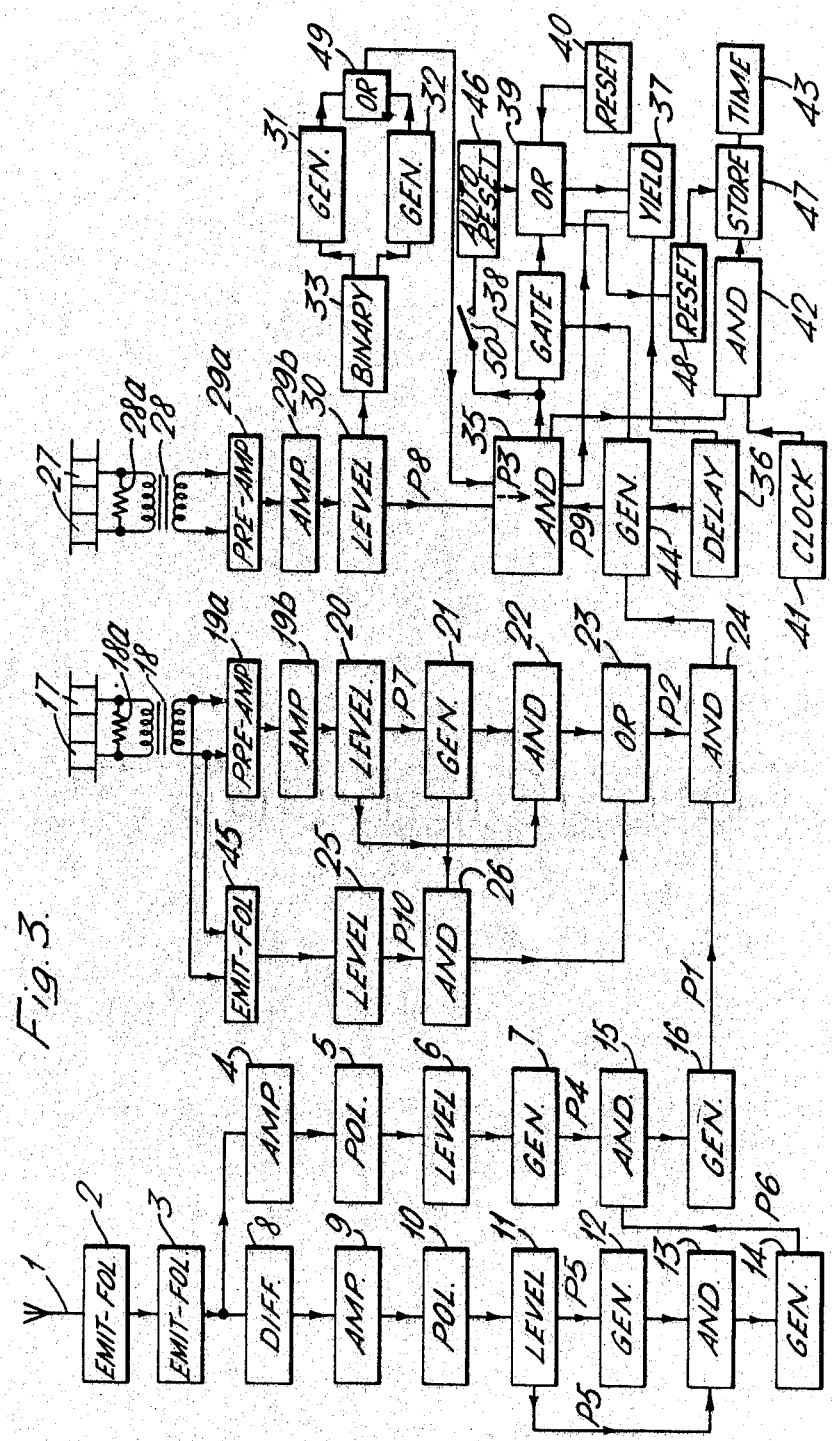
FIG. 3 is a block schematic circuit diagram of an embodiment of the present invention.

Referring now to FIG. 3, the radiofrequency signal is received by a 1 metre vertical rod aerial 1 and fed via a 12.5:1 attenuator to a broad-band emitter-follower 2, whose output is connected via an unbalance-to-balance transformer and a balanced twin cable to a similar transformer and a further emitter-follower 3. This allows aerial 1 and emitter-follower 2 to be located remotely from the remainder of the system with the minimum risk of interference pick-up by the interconnecting cable.

From emitter-follower 3 the signal feeds two separate channels, one of which measures amplitude, and the other rate-of-rise and duration. The amplitude channel comprises an amplifier 4 having a gain of 10 followed by a polarity unifier 5 which comprises a phase-splitter followed by an OR gate to provide a unipolar output from an input of either polarity. From aerial 1 to the output of unifier 5 the response of the system has a rise-time of 0.1 $\mu$sec. and a droop of $<6\%$ from peak amplitude in 2.5 $\mu$sec. The unipolar signal is fed to a fast Schmitt trigger circuit 6 (switching time 100 nanosecs.) which operates when the field strength level at the aerial exceeds $\pm 3$ volts/metre. The leading edge of the Schmitt pulse triggers a pulse generator 7 which generates a 2.5 $\mu$sec. output pulse P4, constituting the aforementioned fourth pulse.

The rate-of-rise and duration channel comprises a resistance-capacity differentiating circuit 8 having a time-constant of 22 nanosecs., followed by an amplifier 9 having a gain of 250, a rise time of 30 nanosecs. and a droop of $<6\%$ in 2.5 $\mu$sec. The output of the amplifier is thus a pulse whose amplitude is proportional to the rate-of-rise of the signal at aerial 1 and whose duration is equal to that of the rising portion of the signal.

The amplifier output is fed via a polarity unifier 10, similar to unifier 5, to a fast Schmitt trigger circuit 11 which operates when the rate of change of field at the aerial exceeds 5 volts/metre $\mu$sec. The output of trigger circuit 11, P5, constitutes the aforementioned fifth pulse. The leading edge of pulse P5 triggers a pulse generator 12, which generates a 2.5 $\mu$sec. pulse. The latter, together with the differentiated back edge of pulse P5, is fed to an AND gate 13 (constituting the aforementioned first gate means) whose output is connected to a pulse generator 14 generating a 2.5 $\mu$sec. output pulse P6, constituting the aforementioned sixth pulse. Since generator 14 is triggered by the back edge of P5, P6 is only generated if P5 is of shorter duration than 2.5 $\mu$sec.

P6 and P4 are combined in an AND gate 15 (constituting the aforementioned first coincidence circuit) whose output triggers a pulse generator 16 generating an 8.2 msec. output pulse P1, constituting the aforementioned first output pulse. The 2.5 $\mu$sec. pulse generators 7 and and 14 are provided to allow for the possibility that trigger circuit 6 may operate at any instant during the rise-time of the radiofrequency pulse, and a coincidence must be obtainable at gate 15 wherever it operates during this period.

The optical transient signal is measured by two channels, one of which examines the fast-rising portion (B in FIG. 2) and the other the slow-rising portion (D in FIG. 2). The fast channel comprises an array of five matched Ferranti MS7B silicon photovoltaic cells 17 connected in parallel and mounted, with their sensitive surfaces in the vertical plane, on the periphery of a horizontal circle, between two horizontal circular plates. As a result of these plates the cell array has a polar diagram of 360° in the horizontal plane and limited to an included angle of 20° in the vertical plane. This limitation reduces to a minimum interference due to variations in direct sunlight, known as "twinkle." The cell array 17 is remotely mounted below the aerial 1. Filters of Chance glass OGR2 1 mm. thick are mounted in front of the cells to centre the optical acceptance band on a wavelength of 0.56 microns with a bandwidth of 0.05 microns.

The cells 17 are arranged to operate in a linear mode over a wide range of light levels by connecting them to a load of very low DC resistance. This ensures that they have the same sensitivity to light transients under all ambient light conditions. The low resistance load is the resistance of the primary winding of a differentiating transformer 18, and is less than 1 ohm. Transformer 18 has a primary:secondary turns ratio of 1:10 and a primary inductance of 10 mh., a resistor 18a of 100 ohms being connected in parallel to give a differentiating time-constant of 100 $\mu$sec. and to critically damp the oscillatory circuit formed by the primary inductance and the self-capacitance of the cells.

The differentiated optical signal from the secondary winding of transformer 18 is fed to a remote pre-amplifier 19a and thence by cable to an amplifier 19b. Amplifiers 19a and 19b have gains of 20 and 80 respectively, giving a combined gain of 1600, a rise-time of 100 $\mu$sec. and less than 2% droop in 8 msecs. The amplified signal is fed to a Schmitt trigger circuit 20 which operates if the differentiated signal across the primary of transformer 18 exceeds 60 $\mu$v., corresponding to a rate of rise of optical signal of 300 mw./cm.$^2$sec. The output of circuit 20 is a pulse P7 of width equal to the duration of the fast-rising portion of the optical signal above the latter rate of rise, this pulse constituting the aforementioned seventh pulse.

The leading edge of pulse P7 triggers a pulse generator 21 which generates an 8 msec. pulse. The latter pulse, together with the differentiated back edge of pulse P7, is fed to an AND gate 22 (constituting the aforementioned second gate means) whose output is connected to an OR gate 23. The back edge of pulse P7 can only pass gate 22 if pulse P7 is of shorter duration than 8 msec. The pulse P7, when passed by gate 22 and thence to gate 23, constitutes P2, the aforementioned second output pulse.

Should the cells 17 become saturated by a large optical signal from a nearby explosion, the P2 pulse is derived by an alternative route. When the cells saturate, their internal shunt resistance falls from several kilohms to a very low value which is effectively in shunt with resistor 18a. The time-constant of the transformer 18 is thereby greatly increased, and it ceases to differentiate but produces an undifferentiated pulse. As the peak of the fast-rising portion may be well beyond the saturation level of the cells, and the undifferentiated pulse will not terminate until after the signal has fallen below saturation level, the pulse may not terminate until well after 8 msec. from the commencement of the fast-rising portion. To avoid this situation preventing the derivation of P2, the output from the primary winding of transformer 18 is fed via a buffer attenuator with a gain of 0.3, a remote emitter-follower 45 and a cable, to a Schmitt trigger circuit 25 which operates when the signal level exceeds 0.3 v. The output pulse P10 of circuit 25 (constituting the aforementioned tenth pulse) is passed to an AND gate 26 to which is also fed the differentiated back edge of the 8 ms. pulse from generator 21; hence only if P10 exceeds 8 msec. in duration is a pulse passed to gate 23. Thus pulse P2 is derived either from trigger circuit 19 (normal optical signal) or from trigger circuit 25 (large optical signal).

The slow optical channel comprises an array of five photo-voltaic cells 27 similar to cells 17 and similarly mounted between the aforementioned parallel plates, the cells 27 being interspaced between the cells 17. Cells 27 are connected in parallel to the primary winding of transformer 28 which has a resistance of less than 1 ohm to ensure operation in the linear mode. The primary inductance is 2H and the parallel damping resistor 28a is 1.4 K ohm., giving a differentiating time-constant of 1.5 msec. The transformer ratio is again 1:10.

The slow-rising differentiated optical signal is fed to a remote pre-amplifier 29a, and thence by cable to an amplifier 29b. Amplifiers 29a and 29b have gains of 100 and 50 respectively, giving a combined gain of 5000, a rise-time of 10 msec. and a droop of less than 1% in 80 msec. The amplified signal is fed to a Schmitt trigger circuit 30 which operates if the voltage across the primary of transformer 28 exceeds 20 $\mu$v, corresponding to a rate of rise of the optical signal of 1.8 mw./cm.$^2$ sec. The output of circuit 30 is a pulse P8 (constituting the aforementioned eighth pulse) having a duration equal to that of the slow-rising portion of the optical signal above the latter rate of rise.

The leading edge of pulse P8 triggers one of the pulse generators 31, 32 via a binary circuit 33. Both these generators produce 80 msec. output pulses whose differentiated back edges are fed via an OR circuit 49 to an AND gate 35, constituting the aforementioned third gate. Thus only if pulse P8 exceeds 80 msec. in duration can an output be obtained from gate 35. As gate 35 has a further function, to be explained, an output pulse is not actually obtained therefrom unless a further input (P9) is present. The notional output pulse, "P3," obtainable from gate 35 disregarding this further input P9, constitutes the aforementioned third output pulse. (In another embodiment of the invention P8 is fed to AND circuit 35 via a further gate closed by the undifferentiated output of generators 31, 32, in which case P3 actually appears.)

The reason for the binary circuit 33 and the two generators 31, 32 is as follows. Because of the long time-constant of transformer 28 and the succeeding signal channel, it is possible for the fast-rising portion of the optical signal to enter this channel and operate trigger circuit 30. The resulting short-duration pulse cannot pass gate 35 but can cause errors in the timing of a signal from the slow-rising portion which follows it. Assuming that a "fast" signal operates generator 30, one of the generators 31, 32 is operated via binary 33 and gate 35 blocks the pulse. The arrival of a "slow" signal from the slow-rising portion which follows it. via the alternative mode of the binary circuit 33, which closes gate 35 for the second time. Thus only if the P8 pulse exceeds 80 msec. is "P3" produced.

For the first, second and third output pulses to arrive from a nuclear explosion, they must appear in a given time sequence. The three pulses are combined in such a way that an indication of an explosion is given only if this sequence is obtained, thereby reducing the chance of such an indication if the pulses arise from other phenomena.

In the case of a nuclear explosion, the P2 pulse will commence within 8 msec. of the commencement of the P1 pulse. To check this condition, the P1 and P2 pulses are fed to an AND circuit 24 (constituting the aforementioned second coincidence circuit), from which an output pulse is obtained only if this condition is met. (P1 is prolonged to 8.2 msec. as described, to ensure coincidence with P2 when the latter is derived from P10, i.e. at 8 msec., under saturation conditions.) The latter pulse triggers a pulse generator 44 which produces a 1 second pulse P9, constituting the aforementioned ninth pulse. In the case of a nuclear explosion, the notional "P3" pulse will commence within 1 second of the coincidence of the P1 and P2 pulses. This condition is checked by feeding P9 to the AND circuit 35, (which thus also constitutes the aforementioned third coincidence circuit), an output from which indicates the occurrence of a nuclear explosion.

The yield of the explosion is determined by measuring the time T in FIG. 2 as the interval between the commencement of the P2 and "P3" pulses. When pulse generator 44 is triggered, a signal is passed via a delay unit 36 to start a millisecond stop-clock in a yield indicator 37. Unit 36 delays the signal for 80 msec. to allow for the fact that "P3" does not appear until at least 80 msec. after point C in FIG. 2. The clock is stopped by an output pulse from AND circuit 35, i.e. the occurrence of the "P3" pulse. The stop-clock reading is converted to yield using the aforementioned equation. (As P2 is not generated until 8 msec. from the commencement of the fast-rising portion of the optical signal, this reading is actually 8 msec. less than the time T in FIG. 2, but the error thus introduced is not significant.)

Should pulse "P3" not appear within 1 second, a reset signal is passed by the back edge of the 1 second pulse produced by generator 44 via a gate 38 and an OR circuit 39 to reset the stop-clock to zero. However if "P3" does appear within 1 second, indicating a nuclear explosion, a pulse from AND circuit 35 closes gate 38 and prevents the back edge of the 1 second pulse from resetting the stop-clock. The latter can be reset manually by a signal from a reset unit 40 via OR circuit 39, or automatically, if desired, by closing switch 50, which causes the output of AND circuit 35 to generate a delayed reset pulse in circuit 46 which is fed to OR circuit 39.

The time at which the explosion occurs is recorded by sampling the output of a continuously-running digital clock 41, which is fed through an AND circuit 42. (AND circuit 42 represents a plurality of individual AND circuits connected to the binary outputs of clock 41 corresponding to the hour, minute and second digits, in a known manner.) The output from AND circuit 35 (indicating a nuclear explosion) is also fed to AND circuit 42, and a coincidence between the continuous clock output and the pulse from circuit 35 causes the instantaneous time to be stored in a binary store 47 and displayed on an indicator 43. The store 47 is reset to zero by a pulse from a reset circuit 48 triggered from OR circuit 39.

It is estimated that the described embodiment has a minimum range of 75 miles for 90% of the time in ambient environmental conditions typical of the United Kingdom, and that yields of between 30 kilotons and 30 megatons can be measured with a 95% probability of lying within ±45% of the true value. If the explosion is known to be atmospheric the yield given by the aforementioned equation can be multiplied by 1.2 to give a yield value with a 95% probability of lying within about ±25% of the true value. Similarly, if the explosion is known to be on the surface of the ground, the yield given by this equation can be divided by 1.2 to give a yield value with a 95% probability of lying within ±25% of the true value.

It is further estimated that the number of false alarms in the environment of the United Kingdom will be of the order of 100 per annum, which will occur during clearly apparent local thunderstorms. If several of the present systems are spaced more than 30 km. apart (beyond the range of local thunderstorm effects), and only those alarms occuring coincidentally at the several location are treated as true alarms, the number of false alarms will be unlikely to exceed 1 per annum.

We claim:

1. A nuclear explosion detection system comprising means for receiving the transient radio-frequency signal radiated from the explosion, means for deriving from said radio-frequency signal a first output pulse if its rate of rise exceeds a predetermined value, its duration is less than a predetermined time and its field-strength exceeds a predetermined level, means for receiving the fast- and slow-rising portions of the transient optical signal radiated from the explosion and converting them to electrical signals, means for deriving from said fast-rising portion a second output pulse if its rate of rise exceeds a predetermined value and its duration is less than a predetermined time, means for deriving from said slow-rising portion a third output pulse if its rate of rise exceeds a predetermined value and its duration exceeds a predetermined time, and means for causing the occurrence of said first, second and third output pulses in a predetermined time-sequence to indicate a nuclear explosion.

2. A system as claimed in claim 1 wherein the means for converting said portions of the transient optical signal to electrical signals comprises photo-voltaic generator means connected across transformer primary winding means of sufficiently low DC resistance to cause said generator means to operate in a substantially linear mode.

3. A system as claimed in claim 1 wherein the system comprises further means for deriving said second output pulse if the amplitude of said fast-rising portion exceeds the saturation level of the opto-electrical conversion means for more than a predetermined time.

4. A system as claimed in claim 1 comprising means for measuring the time interval between the occurrence of said fast-rising portion and the commencement of said slow-rising portion to indicate the yield of the explosion.

5. A system as claimed in claim 1 wherein the means for deriving said first output pulse cimprises means for generating a fourth pulse of predetermined length if the amplitude of the radio-frequency signal exceeds a predetermined level, means for differentiating the radio-frequency signal and generating a fifth pulse of duration equal to the duration of the differentiated signal above a predetermined amplitude, first gate means opened for a predetermined time by the leading edge of said fifth pulse to pass the back edge of said fifth pulse if of shorter duration than said predetermined time, means triggered by said back edge for generating a sixth pulse of predetermined length, and a first coincidence circuit for combining said fourth and sixth pulses to produce said first pulse.

6. A system as claimed in clam 1 wherein the means for deriving said second output pulse comprises means for differentiating the converted optical signal, said differentiating means having a short time-constant to respond to the fas-rising porion of the optical signal, and for generating a fourth pulse of duration equal to the duration of the differentiated signal above a predetermined amplitude, and gate means opened for a predetermined time by the leading edge of said fourth pulse to pass the back edge of said fourth pulse if of shorter duration than said predetermined time, the output of said gate means constituting said second output pulse.

7. A system as claimed in claim 6 wherein the means for deriving said third output pulse comprises means for differentiating the converted optical signal, said differentiating means having a long time-constant to respond to the slow-rising portion of the optical signal, and for generating a fifth pulse of duration equal to the duration of said differentiated signal above a predetermined amplitude, and second gate means opened at a predetermined time from the leading edge of said fifth pulse to pass said fifth pulse if of longer duration than said predetermined time, such output of said third gate means constituting said third output pulse.

8. A system as claimed in claim 1 wherein the means for causing the occurrence of said first, second and third output pulses to indicate an explosion comprises a second coincidence circuit for combining said first and second output pulses, means triggered by the output of the second coincidence circuit for generating a ninth pulse of predetermined length, and a third coincidence circuit for combining said ninth pulse with said third output pulse, the presence of an output from said third coincidence circuit indicating the occurrence of an explosion.

9. A system as claimed in claim 6 wherein the system comprises further means for deriving said second output pulse if the amplitude of said fast-rising portion exceeds the saturation level of the opto-electrical conversion means for more than a predetermined time, the further means for deriving said second output pulse comprising means for generating a further pulse of duration equal to the duration, above a predetermined level, of the saturating part of the optical signal commencing with the fast-rising portion, third gate means opened at a predetermined time from the leading edge of said seventh pulse to pass said tenth pulse if of longer duration than said predetermined time, and means for combining the output of said third gate means with the output of said first-mentioned gate means.

10. A system as claimed in claim 8 wherein the means for measuring the delay between the occurrence of said fast-rising portion and the commencement of said slow-rising portion comprises timing means started by the output of said second coincidence circuit and stopped by the output of said third coincidence circuit.

11. A nuclear explosion detection system comprising means for receiving the transient radio frequency signal radiated from the explosion, means for deriving from said radiofrequency signal an output pulse provided said signal meets selected criteria, means for receiving the transient optical signal radiated from the explosion and deriving from it at least one electrical signal, means for deriving from said electrical signal a further output pulse provided said optical signal meets selected criteria, and means for causing the occurrence of said output pulses in a predetermined time-relationship to indicate a nuclear explosion.

12. A nuclear explosion detection system comprising means for receiving the transient radiofrequency signal radiated from the explosion, means for deriving from said radiofrequency signal a first output pulse provided said signal meets selected criteria, means for receiving the fast and slow-rising portions of the transient optical signal radiated from the explosion and converting them to electrical signals, means for deriving from said fast-rising portion a second output pulse provided said fast-rising portion meets selected criteria, means for deriving from said slow-rising portion a third output pulse provided said slow-rising portion meets selected criteria, and means for causing the occurrence of said first, second and third output pulses in a predetermined time-sequence to indicate a nuclear explosion.

13. A nuclear explosion detection system comprising means for receiving the transient radiofrequency signal radiated from the explosion, means for deriving from said radiofrequency signal a first output pulse if its rate of rise exceeds a predetermined value, its duration is less than a predetermined time and its field-strength exceeds a predetermined level, means for receiving the fast-rising portion of the transient optical signal radiated from the explosion and converting it to an electrical signal, means for deriving from said fast-rising portion a second output pulse if its rate of rise exceeds a predetermined value and its duration is less than a predetermined time, and means for causing the occurrence of said first and second output pulses in a predetermined time-sequence to indicate a nuclear explosion.

References Cited

UNITED STATES PATENTS

| | | | |
|---|---|---|---|
| 3,160,750 | 12/1964 | Kiehn | 250—83.3 X |
| 3,147,380 | 9/1964 | Buckingham et al. | |
| 3,254,219 | 5/1966 | Finlay et al. | 250—83 X |

ARCHIE R. BORCHELT, Primary Examiner

U.S. Cl. X.R.

250—83